United States Patent
Duelli

(10) Patent No.: US 8,348,234 B2
(45) Date of Patent: Jan. 8, 2013

(54) VACUUM VALVE

(75) Inventor: Bernhard Duelli, Ubersaxen (AT)

(73) Assignee: VAT Holding AG, Haag (CH)

( * ) Notice: Subject to any disclaimer, the term of this patent is extended or adjusted under 35 U.S.C. 154(b) by 180 days.

(21) Appl. No.: 12/775,795

(22) Filed: May 7, 2010

(65) Prior Publication Data

US 2010/0219362 A1    Sep. 2, 2010

Related U.S. Application Data

(63) Continuation of application No. PCT/AT2008/000435, filed on Dec. 5, 2008.

(30) Foreign Application Priority Data

Dec. 6, 2007 (DE) .................. 10 2007 059 039

(51) Int. Cl.
*F16K 3/02* (2006.01)
*F16K 25/00* (2006.01)

(52) U.S. Cl. .................. 251/204; 251/328

(58) Field of Classification Search .......... 251/203–204, 251/326–329
See application file for complete search history.

(56) References Cited

U.S. PATENT DOCUMENTS

| | | | | |
|---|---|---|---|---|
| 105,027 A | * | 7/1870 | Belfield | 251/152 |
| 122,566 A | * | 1/1872 | Chapman et al. | 251/203 |
| 571,880 A | * | 11/1896 | Lunken | 251/275 |
| 1,482,836 A | * | 2/1924 | Brubaker et al. | 251/203 |
| 1,506,386 A | * | 8/1924 | Schauman | 126/285 A |
| 1,808,715 A | * | 6/1931 | Reynolds | 138/44 |
| 2,064,567 A | * | 12/1936 | Riley | 137/244 |
| 2,676,780 A | * | 4/1954 | Wheatley | 251/204 |
| 2,947,511 A | * | 8/1960 | McInnes | 251/203 |
| 2,982,513 A | * | 5/1961 | Krummel | 251/203 |
| 3,185,435 A | | 5/1965 | Hauser | |
| 3,258,244 A | * | 6/1966 | Hilton | 251/203 |
| 3,351,180 A | * | 11/1967 | Herzog et al. | 198/359 |
| 3,352,535 A | | 11/1967 | Power | |
| 3,397,862 A | | 8/1968 | Batzer et al. | |
| 3,554,486 A | | 1/1971 | Thebado | |
| 3,722,857 A | * | 3/1973 | Townsend | 251/203 |
| 4,201,365 A | * | 5/1980 | Paptzun et al. | 251/328 |
| 4,294,427 A | * | 10/1981 | Cilny | 251/86 |
| 4,470,576 A | | 9/1984 | Schertler | |

(Continued)

FOREIGN PATENT DOCUMENTS

DE    1957309    5/1970

(Continued)

*Primary Examiner* — John Bastianelli
(74) *Attorney, Agent, or Firm* — Volpe and Koenig, P.C.

(57) ABSTRACT

A vacuum valve including a valve opening, a valve seat surrounding the valve opening, and a valve plate. During closing starting from the open position, the valve plate is moved over a main section of the closing path in a main closing direction parallel to the valve plate and the plane of the sealing surface, and then over a final section running at an angle to the sealing surface plane for guiding the valve plate onto the valve seat. A guide element on the wall that guides the valve plate over the end section of the closing path interacts with a guide element on the valve plate. The valve plate is guided over the final section of the closing path by guide surfaces that are angled relative to the sealing surface, and at least one guide surface is arranged on a guide element of the valve plate or the wall.

21 Claims, 13 Drawing Sheets

U.S. PATENT DOCUMENTS

| | | | |
|---|---|---|---|
| 4,534,540 A * | 8/1985 | Bragin et al. | 251/203 |
| 4,560,141 A | 12/1985 | Bosch | |
| 4,921,213 A | 5/1990 | Geiser | |
| 5,026,995 A | 6/1991 | Hazaki et al. | |
| 5,427,353 A * | 6/1995 | Lewis | 251/203 |
| 5,743,296 A | 4/1998 | Bosch | |
| 6,056,266 A | 5/2000 | Blecha | |
| 6,390,448 B1 | 5/2002 | Kroeker et al. | |
| 6,427,973 B1 * | 8/2002 | Wagner | 251/175 |
| 6,776,394 B2 | 8/2004 | Lucas | |
| 6,899,316 B2 | 5/2005 | Duelli | |
| 6,913,243 B1 | 7/2005 | Tomasch | |
| 7,059,583 B2 | 6/2006 | Tomasch | |
| 7,066,443 B2 | 6/2006 | Ishigaki | |
| 2004/0129910 A1 | 7/2004 | Ishigaki | |
| 2006/0219969 A1 * | 10/2006 | Young et al. | 251/203 |
| 2007/0228314 A1 | 10/2007 | Geiser | |

FOREIGN PATENT DOCUMENTS

| | | |
|---|---|---|
| DE | 3209217 | 10/1985 |
| DE | 3224387 | 5/1987 |
| DE | 4019385 | 9/1993 |
| DE | 4341816 | 6/1995 |
| DE | 19633798 | 2/1998 |
| DE | 102005037410 | 2/2007 |
| GB | 2177743 | 1/1987 |
| JP | 58118388 | 7/1983 |
| WO | 2004005781 | 1/2004 |
| WO | 2005064236 | 7/2005 |

* cited by examiner

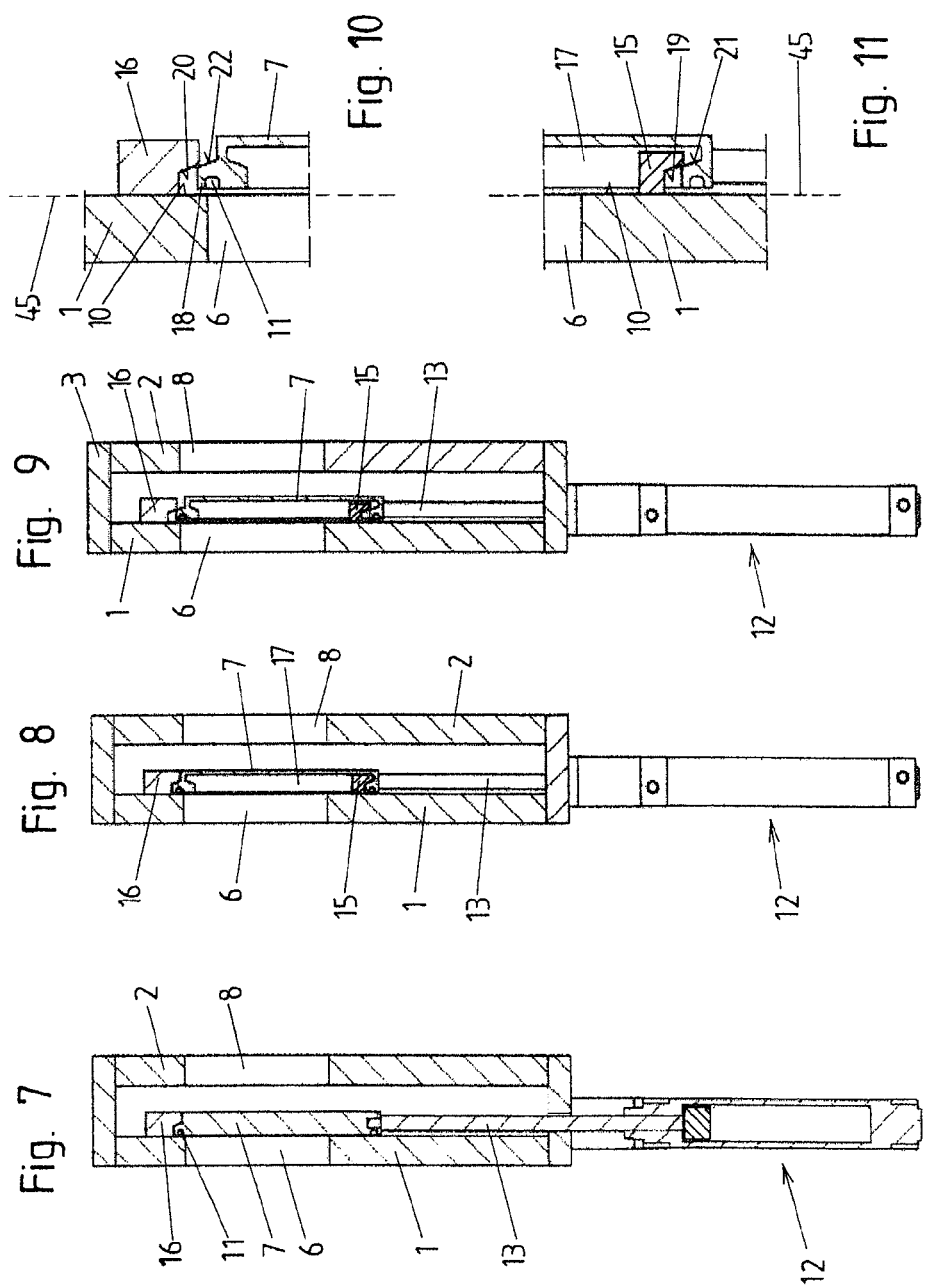

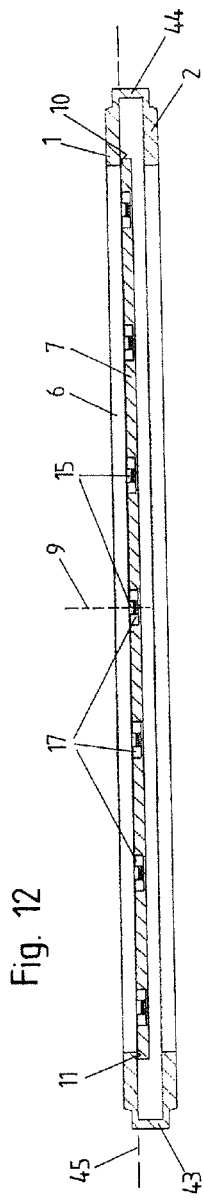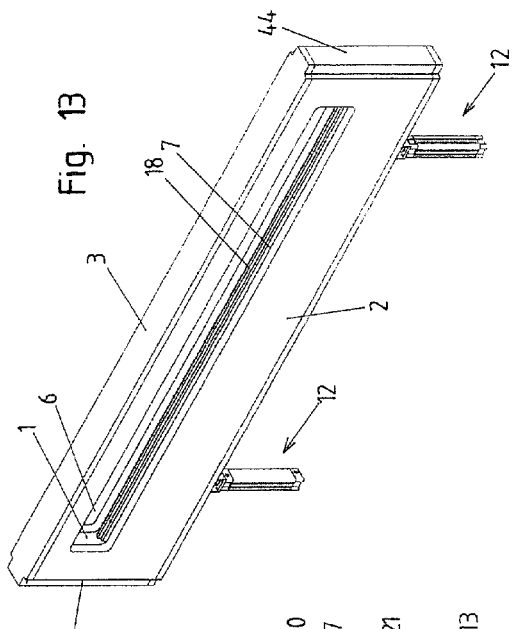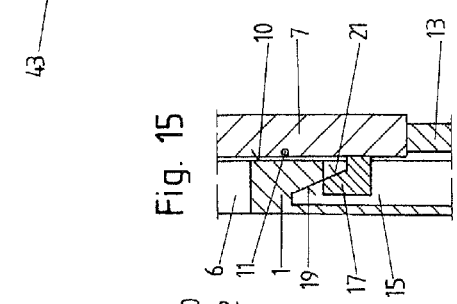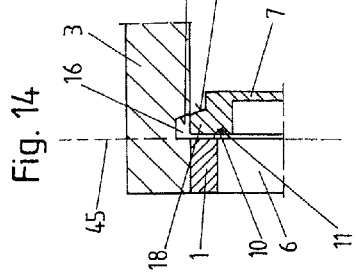

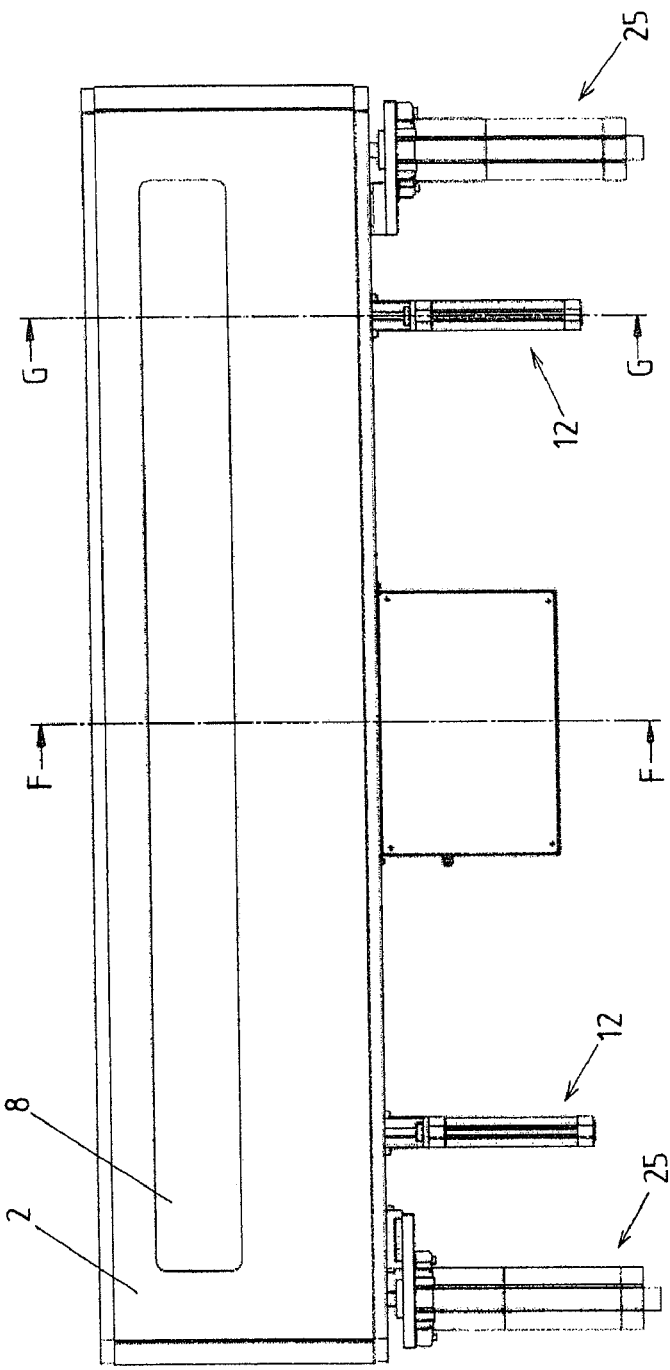

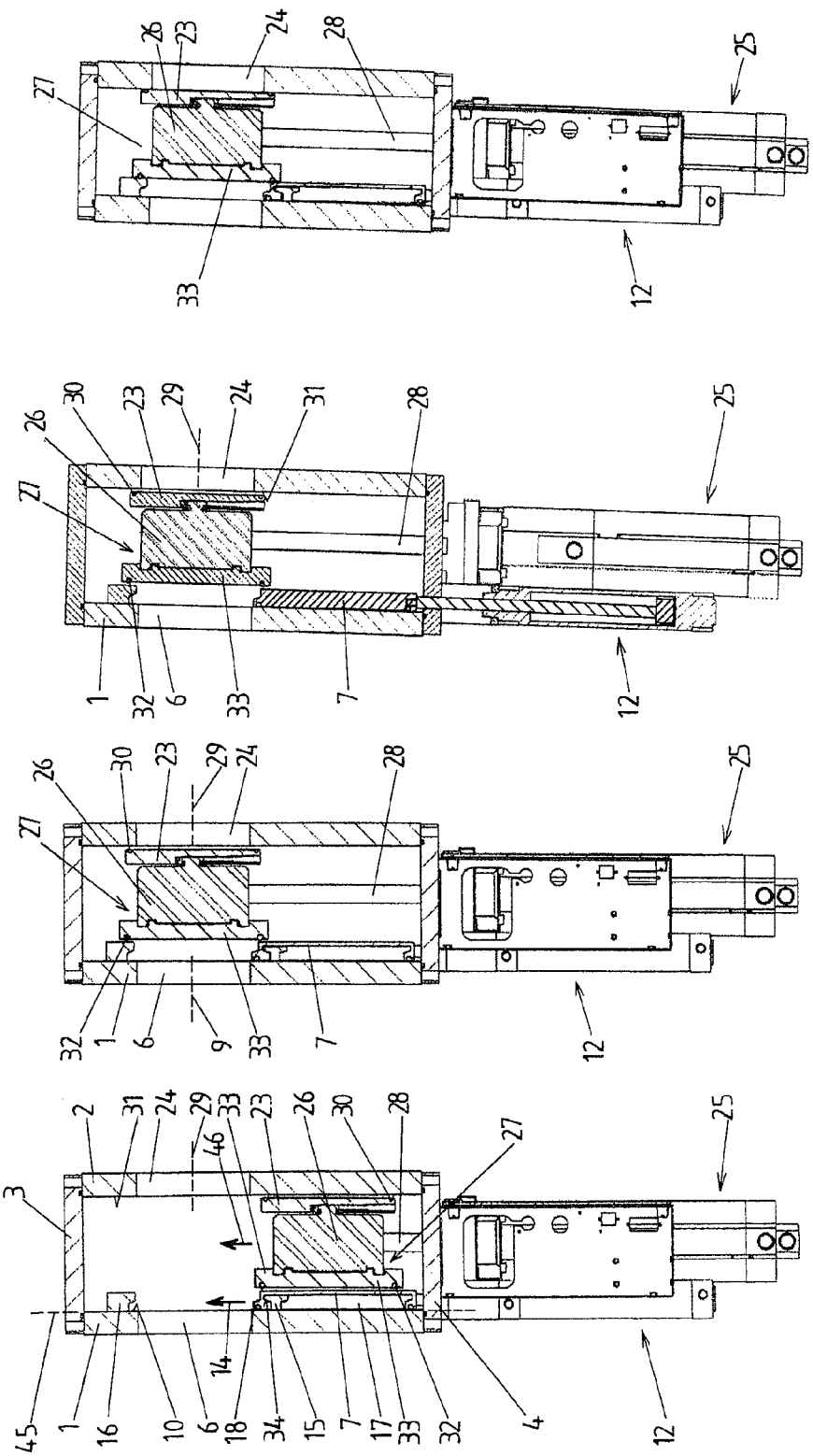

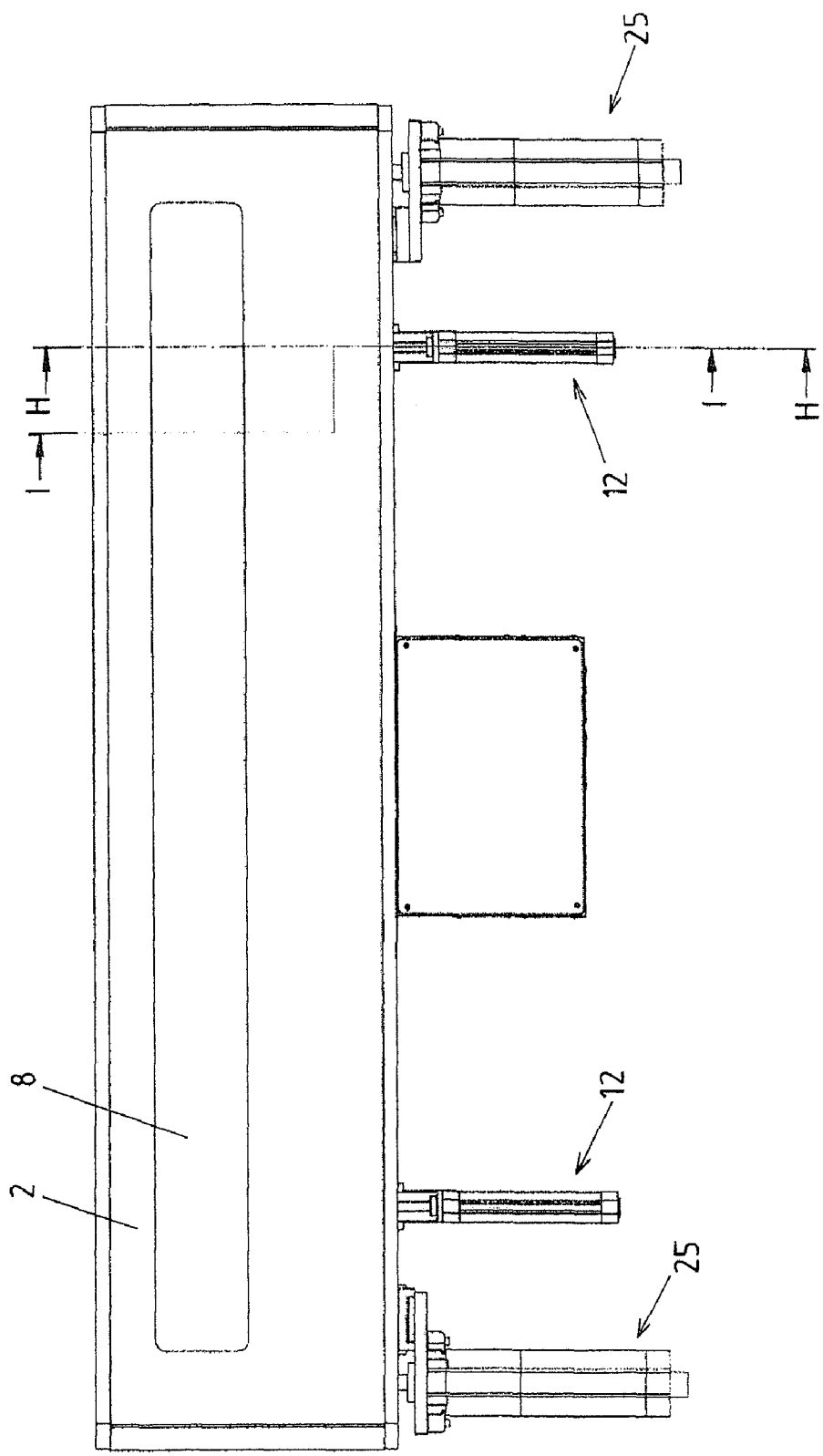

VACUUM VALVE

CROSS-REFERENCE TO RELATED APPLICATIONS

This application is a continuation of PCT International Application No. PCT/AT2008/000435, filed Dec. 5, 2008, which claims the benefit of German Patent Application No. 10 2007 059 039.5, filed Dec. 6, 2007, both of which are incorporated herein by reference as if fully set forth.

BACKGROUND

The invention relates to a vacuum valve comprising a wall with a valve opening and a valve seat that surrounds the valve opening and that has a sealing surface lying in a plane or a sealing ring lying in a plane and a valve plate that can be adjusted over a closing path from an open position, in which it frees the valve opening, into a closed position, in which it closes the valve opening, wherein this valve plate has a sealing ring that is pressed onto the sealing surface of the valve seat in the closed position or a sealing surface on which the sealing ring of the valve seat is pressed in the closed position, wherein the valve plate is moved, during the closing of the vacuum valve starting from the open position of the valve plate, over a main section of the closing path in a main closing direction that is parallel to the valve plate and that is parallel to the plane of the sealing surface or the sealing ring of the valve seat and is then moved, following the main section of the closing path, over a final section of the closing path running at an angle to the valve plate and at an angle to the plane of the sealing surface or the sealing ring of the valve seat for guiding the valve plate onto the valve seat.

Vacuum valves according to a type of plate valves in which the valve opening is closed by a valve plate that is pressed against the valve seat surrounding the valve opening have become known in many different embodiments. Here, in order to expose the seal formed of an elastic material to shear loading that is not too strong, it is known to perform the closing movement of the valve plate in two stages. In a first section of the closing path that comprises a large part of the extent of the closing path, the valve plate is moved from an open position freeing the valve opening into an intermediate position covering the valve opening but still lifted from the valve seat. In the final section of the closing path, the valve plate is moved from the intermediate position into the closed position in which it is pressed onto the valve seat and seals the valve opening.

In the case of a conventional type of slide valves, this two-stage movement process of the valve plate is caused by mechanical elements that are arranged between a carrier plate moved by at least one actuator and the valve plate. These mechanical elements can involve roller bodies that are guided in wedge-shaped columns between the valve plate and the carrier plate, lever mechanisms or rocking elements between these two plates. In order to avoid or limit bending of the valve rod during the second movement step, the carrier plate or a similar support plate connected to the support plate by mechanical elements used for spreading is supported against a wall of the valve housing opposite the valve seat. Such slide valves are known, for example, from U.S. Pat. No. 4,560,141 A, DE 3 209 217 C2, DE 3224387 C2, and U.S. Pat. No. 3,185,435 A.

Furthermore, the second section of the closing movement can be achieved by pivoting the valve rod about an axis lying at a right angle to the valve rod. This pivoting of the valve rod can be achieved, for example, by a connecting rod guide, compare, e.g., U.S. Pat. No. 7,066,443 B2, or by use of separate actuators, compare, e.g., U.S. Pat. No. 7,059,583 B2, U.S. Pat. No. 6,390,448 B1, or DE 19 633 798 A1.

Furthermore, it is known to construct the second section of the closing movement such that the valve plate can be moved relative to a carrier plate through the use of at least one actuator, wherein this carrier plate can be moved over the first section of the closing path by the at least one actuator. Such vacuum valves are known, for example, from U.S. Pat. No. 6,056,266 and U.S. Pat. No. 6,899,316 B2.

Furthermore, from U.S. Pat. No. 6,776,394 B2, a so-called pendulum valve is known in which, in the first step, the valve plate is shifted not in a linear way, but instead is pivoted along a circular arc. In order to achieve a sufficient contact force of the valve plate on the valve seat, tappets that can move in the valve housing are provided here with which the valve plate can be pressed onto the valve seat. From US 2007/0 228 314 A1, a pendulum valve emerges in which the movable tappets are supported in the valve plate and supported on the housing.

For a different type of plate valves or slide valves, the sealing surface and the sealing ring are constructed three-dimensionally such that during the straight-line travel of the valve plate into the valve seat, no shear loads act on the elastomer seal. The valve plate is shifted in a straight line over its entire closing path from its open position into its closed position. Such a valve is known, for example, from U.S. Pat. No. 4,921,213.

It has further become known to arrange two closing elements that can be activated independently from each other in a common valve housing, wherein a first valve opening can be sealed by the first closing element and a second valve opening can be sealed by the second closing element.

Plate valves in which, in the first section of the closing movement, the valve plate is shifted linear to the plane of the valve seat and is shifted in the final section of the closing movement essentially perpendicular to the valve seat and is pressed onto this valve seat, are also designated as L-valves. If, in the final section of the closing movement, the movement is realized at an angle to the direction of movement of the first step and to the plane of the valve seat, then the designation J-valve is also used.

SUMMARY OF THE INVENTION

The object of the invention is to provide a vacuum valve of the type noted above that has a simple construction, wherein a vacuum valve constructed in a manner according to the invention is suitable, in particular, for elongated or slot-shaped valve openings.

According to the invention, this is made possible by a vacuum valve comprising:

a wall with a valve opening and a valve seat that surrounds the valve opening and that has a sealing surface lying in a plane or a sealing ring lying in a plane, a valve plate that can be moved over a closing path from an open position, in which it frees the valve opening, into a closed position, in which it closes the valve opening, and that has a sealing ring that is pressed in the closed position onto the sealing surface of the valve seat or a sealing surface onto which, in the closed position, the sealing ring of the valve seat is pressed, wherein, during the closing of the vacuum valve, starting from the open position of the valve plate, the valve plate is moved over a main section of the closing path in a main closing direction that is parallel to the valve plate and parallel to the plane of the sealing surface or the sealing ring of the valve seat, and is then moved, following the main section of the closing path, over a final section of the closing path running at an angle to the plane of the sealing surface or the sealing ring of the valve seat for guiding the valve plate onto the valve seat, and at least one guide element that guides the valve plate over the final section of the closing path and that is arranged on the wall and that interacts with a guide element arranged on the valve plate, wherein the guide of the valve plate over the final section of the closing path is performed by guide surfaces sitting at an angle to the plane of the sealing surface or the sealing ring of the valve seat, and at least one of these guide surfaces is arranged on one of the guide elements of the valve plate or on one of the guide elements arranged on the wall.

Through the arrangement of the at least one guide element that leads the valve plate over the final section of the closing path on the wall having the valve opening, a simple space-saving construction can be achieved. Here, a contact force to be exerted for pressing the valve plate onto the valve seat can be received directly by the wall having the valve opening, which is advantageous especially for elongated or slot-shaped valve openings (because tolerances or flexibilities of other parts of the vacuum valve do not influence uniform pressing of the valve plate onto the valve seat over the length of the valve opening).

In one advantageous embodiment of the invention, guide elements for guiding the closing movement of the valve plate over the final section of its closing path are arranged on the wall in front of and behind the valve opening (with respect to the main closing direction), wherein these guide elements interact with guide elements of the valve plate. At least one of the two interacting guide elements has a guide surface sitting at an angle to the valve plate and at an angle to the plane of the sealing surface or the sealing ring of the valve seat (this guide surface is thus not parallel to the plane of the sealing surface or the sealing ring of the valve seat). These guide surfaces that can also be designated as inclined surfaces here preferably have a constant angle of inclination, wherein, however, a changing angle of inclination is also conceivable and possible. Instead of the arrangement of the at least one guide element arranged behind the valve opening on the wall (with respect to the main closing direction), the at least one arranged guide element could also be arranged on a side wall of the vacuum valve that projects from the wall having the valve opening.

In one alternate embodiment of the invention it is provided that a projection of the wall located in front of the valve opening (with respect to the main closing direction) or a part attached to the wall or projecting from this wall projects into a recess in the valve plate. Here, the projection of the wall or the part attached to the wall and projecting from this wall and the recess, optionally in connection with parts, e.g., guide rollers, arranged on this recess form interacting guide elements for guiding the valve plate over the final section of the closing path. In a different embodiment of the invention it is provided that a projection of the valve plate or a part attached to the valve plate and projecting from this valve plate projects into a recess lying in front of the valve opening (with respect to the main closing direction) in the wall. Here, the projection of the valve plate or the part projecting from the valve plate and the recess, optionally together with parts, e.g., guide rollers arranged on this recess form guide elements for guiding the valve plate over the final section of the closing path.

The at least one guide element arranged stationary relative to the wall and behind the valve opening (with respect to the main closing direction) can be formed by a projection of the wall, a part attached to the wall and projecting from this wall, a recess in the side wall projecting from the wall, a projection of the side wall, or a part attached to the side wall and projecting from this side wall.

In one alternate embodiment of the invention, the valve plate forms the sole closing element of the vacuum valve. In a different embodiment of the invention, in addition to the valve plate that forms a first closing element of the vacuum valve for closing the first valve opening in the first wall, there is a second closing element that is used for closing a second valve opening in a second wall. Both closing elements are here arranged within the inner space of a valve housing of the vacuum valve, wherein the first and the second walls are part of this valve housing and advantageously bound the inner space on opposite sides. The two closing elements can be activated independently from each other.

The closure of the second valve opening with the second closing element can be formed, for example, like a kind of L-valve. Through the perpendicular placement of the sealing ring on the sealing surface, the loading of the sealing ring is kept as low as possible, so that this second closing element is designed for a plurality of closing and opening processes. A construction in the form of a J-valve or a different construction of the closure of the second valve opening with the second closing element is also conceivable and possible.

A vacuum valve according to the invention that is equipped with an additional second closing element can be used, for example, as a transfer valve for passing through substrates into a vacuum processing installation. The opening and closing of the vacuum valve in normal operation is performed with the second closing element. If a service of the second closing element is required, then the vacuum valve with the first closing element can be closed and consequently the service on the first closing element can be performed, without the part of the vacuum installation closed by the closing of the first valve opening via the first closing element having to be flooded.

BRIEF DESCRIPTION OF THE SEVERAL VIEWS OF THE DRAWINGS

Additional advantages and details of the invention are explained below with reference to the accompanying drawing.

Shown in the drawings are.

DETAILED DESCRIPTION FO THE PREFERRED EMBODIMENTS

Figure 1:
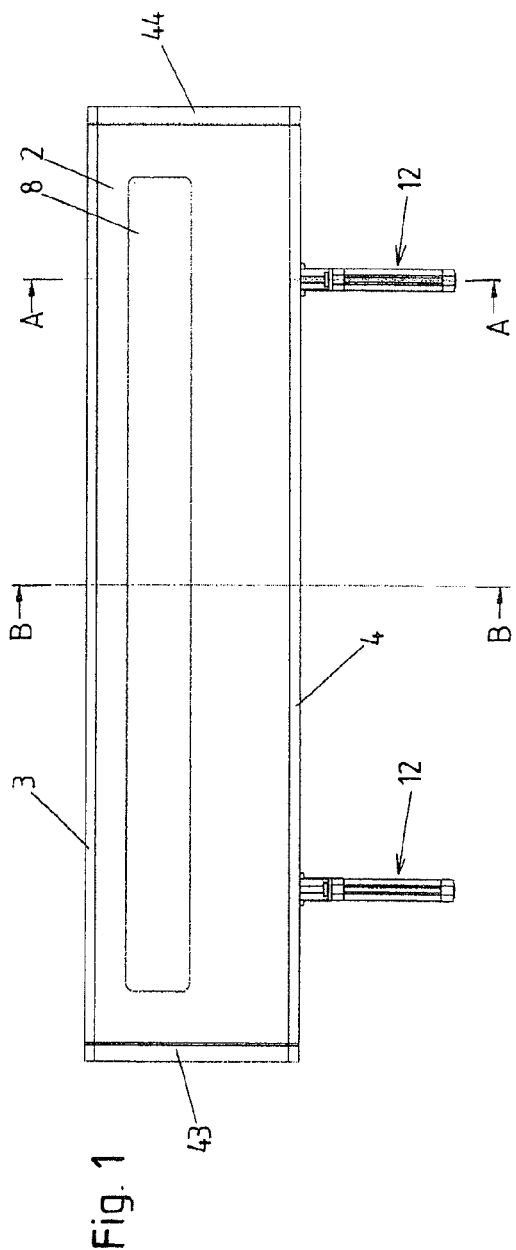
FIG. 1, a first embodiment of a vacuum valve according to the invention in the open position of the valve plate, in an elevation view, FIG. 2, an elevation view of the opposite side of the valve from FIG. 1, wherein the front wall of the valve housing is left off in FIG. 2, FIG. 3, a section view taken along the line AA from FIG. 1, FIG. 4, a section view taken along the line BB from FIG. 1, FIGS. 5 and 6, representations of the vacuum valve corresponding to FIGS. 1 and 2, but in the closing position of the valve plate, FIG. 7, a section view taken along the line CC from FIG. 5, FIG. 8, a section view taken along the line DD from FIG. 5, FIG. 9, a section view corresponding to FIG. 8, but in an intermediate position of the valve plate, FIGS. 10 and 11, enlarged details from FIG. 9, FIG. 12, a section view taken along the line EE from FIG. 5, FIG. 13, an oblique view of the vacuum valve according to the first embodiment, in the open position of the valve plate, FIG. 14, a section view corresponding to FIG. 10 of a modified embodiment, FIG. 15, a section view corresponding to FIG. 11 of an additional modified embodiment, FIG. 16, an additional embodiment of a vacuum valve according to the invention, in the open position of both closing elements, FIG. 17, a section view taken along the line FF from FIG. 16, FIG. 18, a section view corresponding to FIG. 17, but in an intermediate position of the second closing element, FIG. 19, a section view taken along the line GG from FIG. 16, wherein, however, the second closing element is located in the intermediate position shown in FIG. 18, FIG. 20, a section view corresponding to FIG. 18, but in the closed position of the second closing element, FIG. 21, a view of the vacuum valve corresponding to this additional embodiment, wherein the first closing element is located in the closed position and the second closing element is located in an intermediate position, FIG. 22, a section view taken along the line II from FIG. 21, FIG. 23, a section view taken along the line HH from FIG. 21, FIG. 24, an elevation view of the vacuum valve according to this additional embodiment from the opposite side, FIG. 25, a section view taken along the line JJ from FIG. 24, FIG. 26, a section view corresponding to FIG. 23, but with disassembled second closing element, FIG. 27, a section view taken in the same sectional plane as FIG. 25, but in the opposite viewing direction and with disassembled closing element, FIG. 28, an oblique view of the vacuum valve according to this additional embodiment, in the closed position of the second closing element, FIG. 29, a section view through an actuator for the second closing element.

Analogous parts are provided in the different embodiments with the same reference symbols.

A first embodiment of the invention will be explained below with reference to FIGS. 1 to 13. The vacuum valve according to this embodiment has a valve housing with walls 1, 2 and side walls 3, 4, 43, 44 that enclose an inner space 5 that represents a vacuum region of the valve, i.e., in the state of the valve connected to valve chambers, a vacuum can be maintained in the inner space 5.

The wall 1 has a valve opening 6 that can be closed by a valve plate 7. The opposite wall 2 likewise has an opening 8. The valve opening 6, the inner space 5, and the opening 8 form a passage channel through the vacuum valve.

The valve housing can be connected conventionally by flanges that are formed or arranged on the first and second wall 1, 2 to other parts of a vacuum installation. These flanges are not shown in the schematic drawing.

In the completely open state of the vacuum valve, the valve plate 7 is in its open position (cf. FIGS. 1 to 4) and frees the valve opening 6, advantageously completely, i.e., viewed in the direction of the axis 9 of the valve opening 6, it does not cover the valve opening 6.

In the completely closed state of the vacuum valve, the valve plate 7 is located in its closed position (cf. FIGS. 5 to 8), wherein it is pressed onto a valve seat surrounding the valve opening 6. The valve seat is formed in the shown embodiment by a sealing surface 10 on which an elastic sealing ring 11 arranged on the valve plate 7 is pressed. In a modified embodiment, the sealing ring could also be arranged on the valve seat and the sealing surface on the valve. The sealing ring 11 is formed of a suitable elastomer material, for example, Viton.

For adjusting the valve plate 7 over its closing path from its open position into its closed position and back over the reverse opening path, two actuators 12 are used that are formed as piston-cylinder units. Only one actuator could also be used. Also, more than two actuators could be used. The actuators that are used could also have a different shape, for example, as electric motors with suitable transmission means.

Each actuator 12 shifts a corresponding valve rod 13 in the axial direction, wherein the valve plate 7 is attached to the valve rods. More or less than the two valve rods 13 shown could also be provided.

The actuators 12 are each used for moving the valve plate 7 over its entire closing path. Thus, non-separated actuators are provided for different sections of the closing path.

For moving the valve plate 7 starting from their open position into their closed position, the valve plate is initially shifted over a main section of the closing path that takes up the large part of the closing path in a straight line in a main closing direction 14. Here, the valve plate 7 is shifted in its plane, i.e., the main closing direction 14 lies parallel to the valve plate 7. Furthermore, the main closing direction 14 lies parallel to the plane 45 in which the sealing surface 10 of the valve seat is arranged. If a sealing ring is arranged on the valve seat in the mentioned modified embodiment, the main closing direction 14 lies parallel to the plane 45 in which the sealing ring of the valve seat is arranged.

Consequently, the valve plate 7 is moved over a final section of the closing path at an angle (i.e., not parallel) to the main plane of the valve plate and at an angle to the plane 45 of the sealing surface 10 of the valve seat or, if a sealing ring is arranged on the valve seat, at an angle to the plane 45 of the sealing ring of the valve seat until the valve plate 7 is placed on the valve seat and the sealing ring 11 is pressed onto the sealing surface 10. In this closed position of the valve plate 7, the valve opening 6 is sealed by the valve plate 7. The shifting of the valve plate over the final section of the closing path is performed under elastic bending of the valve rods 13.

In FIGS. 9 to 11, the intermediate position of the valve plate 7 is shown that assumes this position at the end of the main section of the closing path or at the beginning of the final section of the closing path. It is clear that the valve plate covers the valve opening viewed in the direction of the axis 9 of the valve opening, but is still lifted off of the valve seat. In order to cause the guide of the valve plate 7 over the final section of the closing path, guide elements 15, 16 arranged on the wall 1 are provided that interact with guide elements 17, 18 of the valve plate 7. Here, at least one guide element 15, 16 that is stationary to the wall 1 is provided in front of and behind the valve opening 6 with respect to the main closing direction 14, wherein, of these guide elements, at least the at least one guide element 15 lying in front of the valve opening 6 is arranged on the wall 1. The at least one guide element 16 lying behind the valve opening 6 is likewise arranged in the shown embodiment on the wall 1. An arrangement on the side wall 3 that projects from the wall 1 having the valve opening 6 is also conceivable and possible, as will be explained farther below in more detail.

The guide elements 15 and 16 arranged on the wall 1 are formed in the shown embodiment by projections that are arranged on the wall 1 and that are formed as separate parts attached to the wall 1. A construction of such projections in one piece with the wall 1 is also conceivable and possible.

The guide elements 15 and 16 arranged on the wall 1 have guide surfaces 19, 20 that sit at an angle to the plane 45 in which the sealing surface 10 of the valve seat lies or, if a sealing ring is arranged on the valve seat, in which the sealing ring of the valve seat lies.

Figure 2:
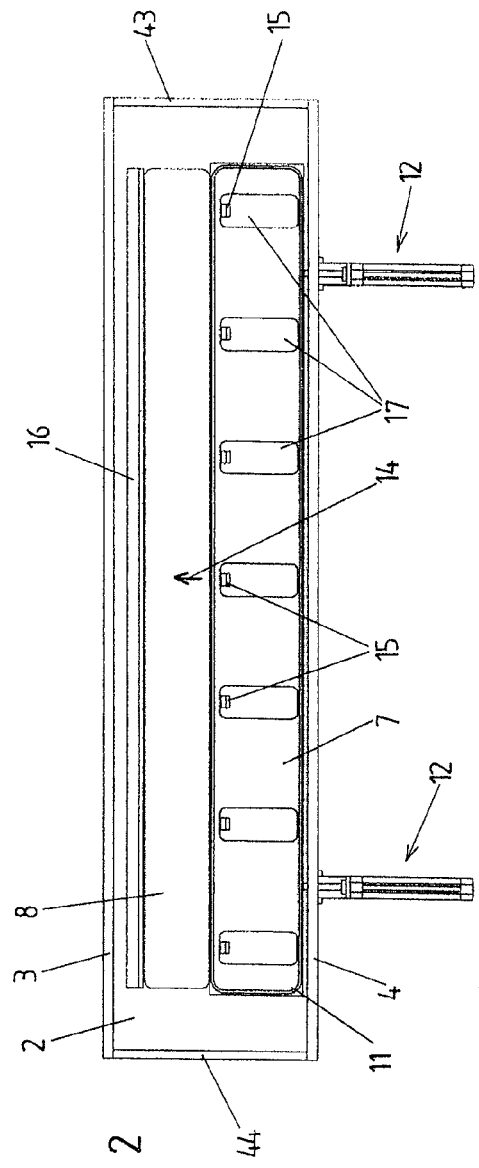
Figure 4:
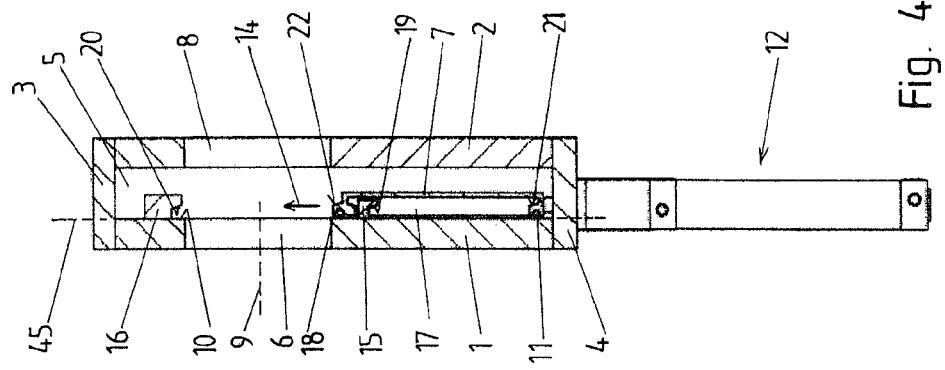
Figure 3:
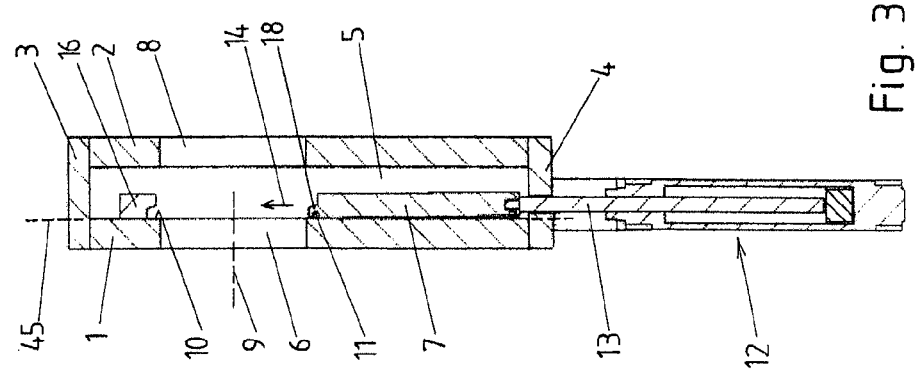
Figure 5:
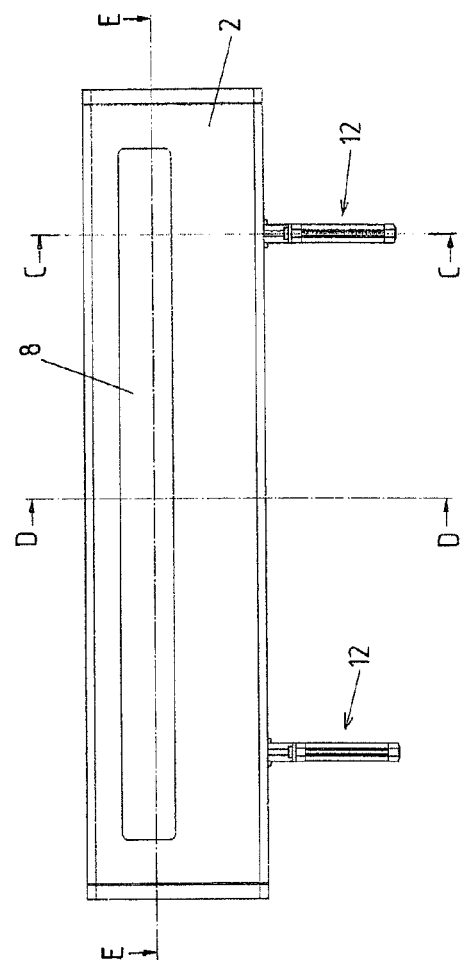
Figure 6:
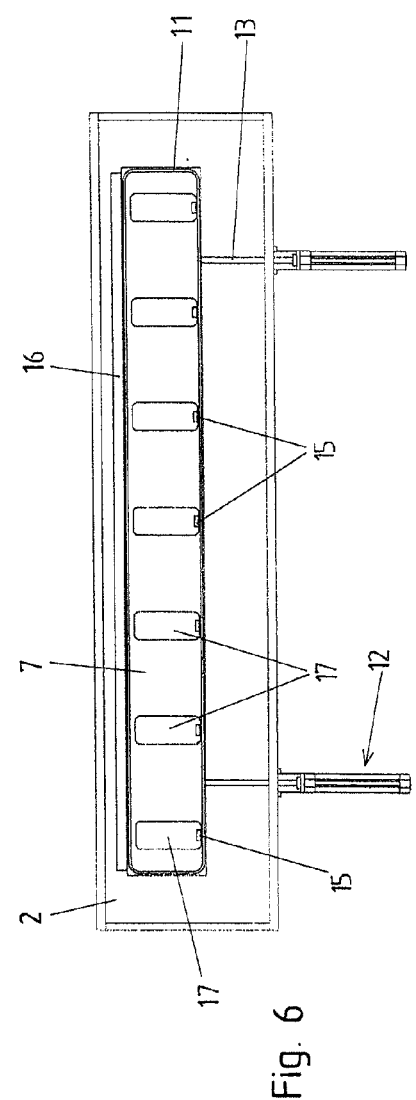
Figure 23:
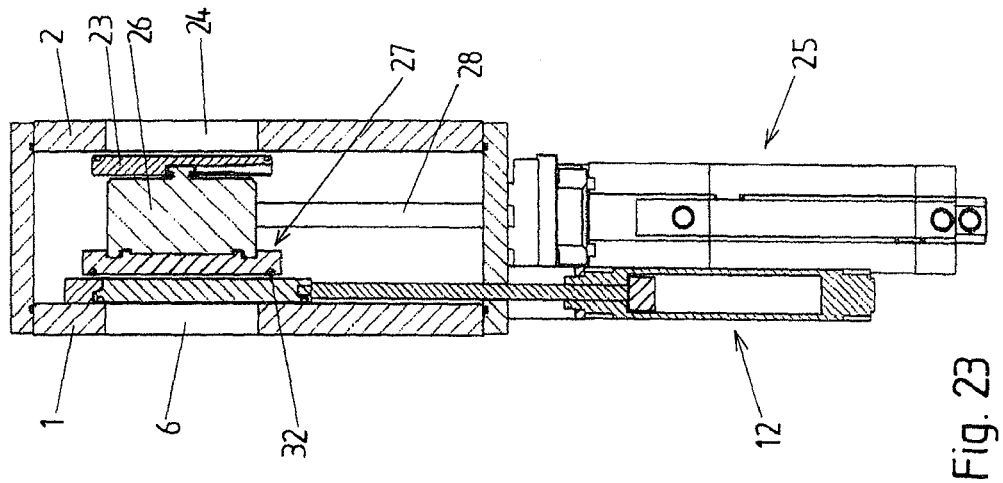
Figure 22:
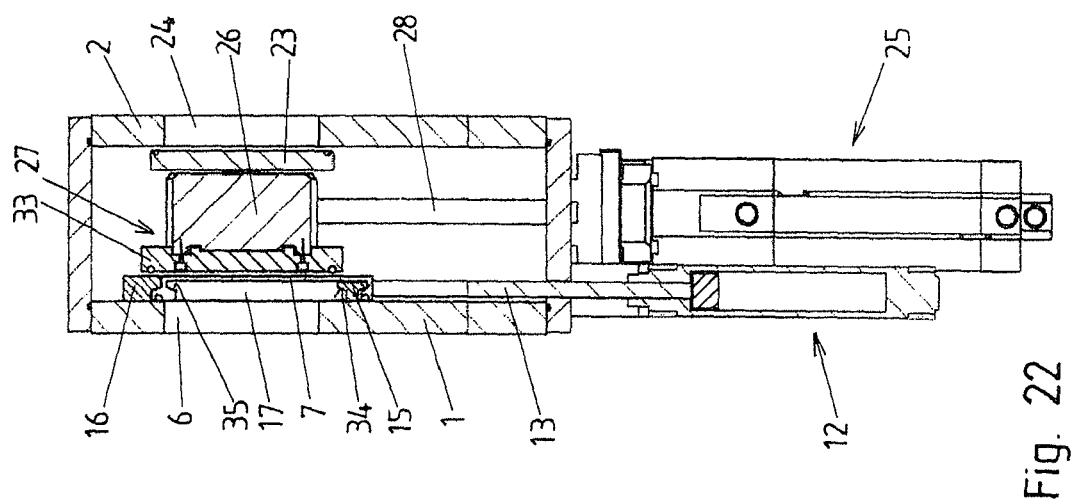
Figure 24:
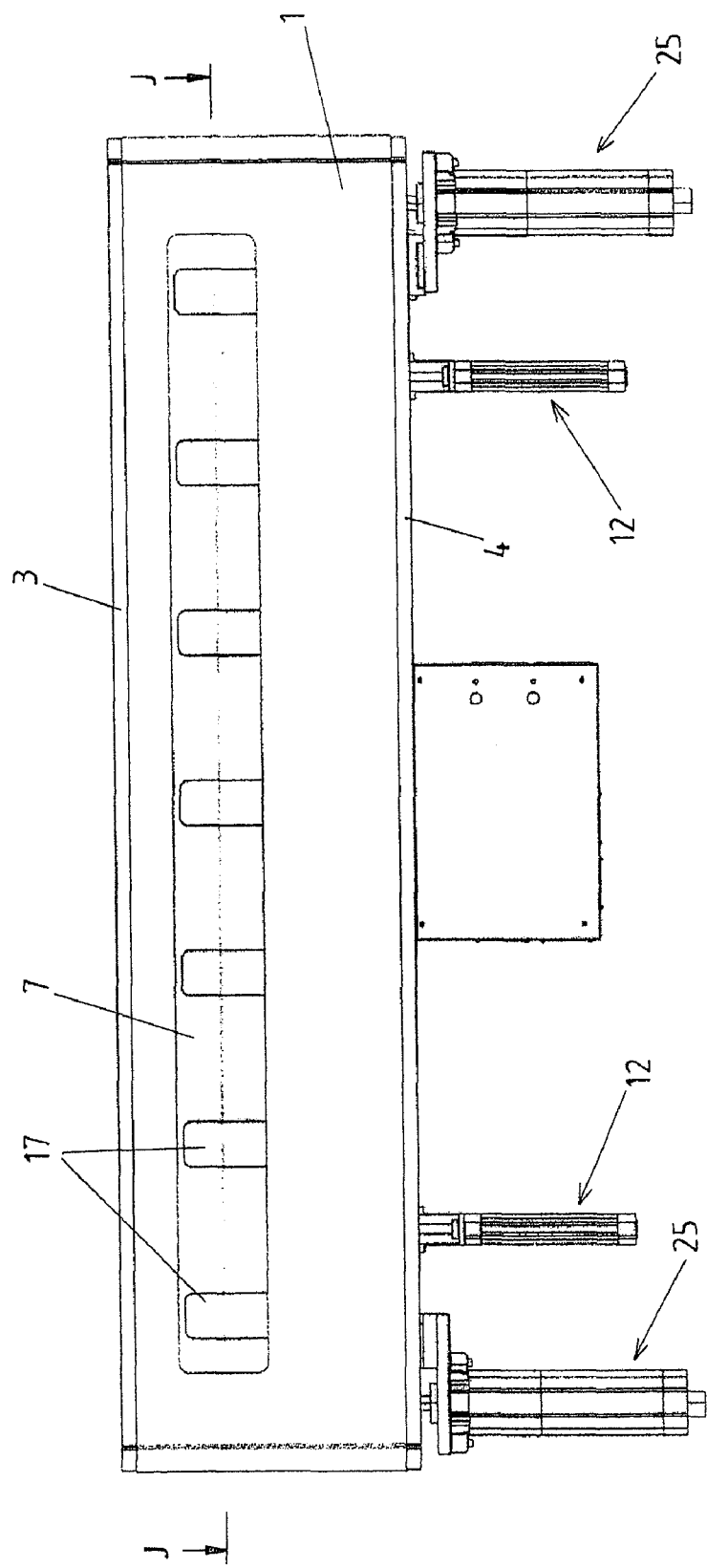
Figure 25:
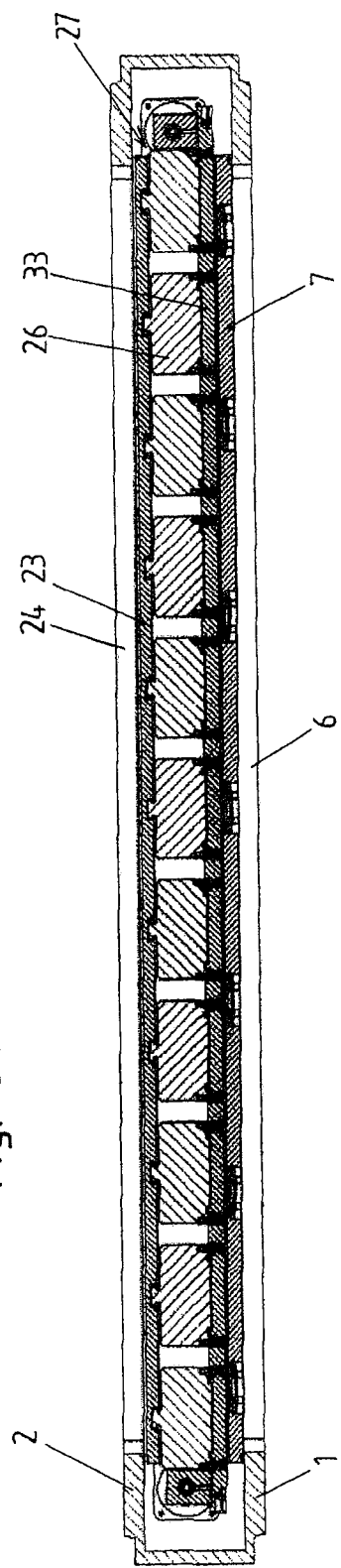

In the direction perpendicular to the main closing direction 14, several guide elements 15 arranged on the wall 1 in front of the valve opening are provided, as is clear, in particular, from FIGS. 2, 6, and 12 (in FIGS. 2 and 6, the front wall 1 is indeed left off, but the guide elements 15, 16 attached to the wall 1 are shown). A corresponding guide element 15 projects into a recess that is cut out in the valve plate on the side of the valve plate 7 facing the wall 1 and that comprises a wall section forming a guide surface 21, wherein this wall section bounds an undercut region of the recess. The guide surface 21 interacts in the end section of the closing path with the guide surface 19 of the corresponding guide element 15. The guide surface 21 sits at an angle to the plane 45 in which the sealing surface 10 of the valve seat lies or, if a sealing ring is arranged on the valve seat, in which the sealing ring of the valve seat lies. The corresponding recess having a guide surface 21 forms a guide element 17 of the valve plate 7.

Instead of several recesses spaced apart from each other perpendicular to the main closing direction in the valve plate 7, a continuous recess could also be present into which the guide elements 15 project or a continuous bar-like guide element 15 projects. For achieving sufficient stability of the valve plate 7, these must have then be constructed with a corresponding overall thickness.

A guide element 18 of the valve plate 7 interacts with the guide element 16 arranged behind the valve opening 6 on the wall 1, wherein this guide element of the valve plate is attached to a projection that extends on the front edge of the valve plate 7 (with respect to the main closing direction 14) and that has, on its side away from the wall 1, a guide surface 22 that sits at an angle to the plane 45 in which the sealing surface 10 of the valve seat lies or, if a sealing ring is arranged on the valve seat, in which the sealing ring of the valve seat lies. The guide surface 22 of the guide element 18 interacts with the guide surface 20 of the guide element 16 arranged on the wall 1.

In the illustrated embodiment, two of the interacting guide surfaces 19, 21; 20, 22 sit at an angle to the plane 45 of the sealing surface 10 or the sealing ring of the valve seat. It would also be conceivable and possible, however, that only one of the two interacting guide surfaces 19, 21; 20, 22 sits at an angle to the plane 45 of the sealing surface 10 or the sealing ring of the valve seat.

The angle of each guide surface relative to the plane 45 of the sealing surface 10 or the sealing ring of the valve seat that encloses this with the plane 45 lies advantageously in the range between 8° and 40°, wherein a range between 10° and 30° is especially preferred.

In the illustrated embodiment, the interacting guide surfaces 19, 21; 20, 22 each have a flat construction. Instead of a flat construction of each guide surface sitting at an angle to the plane, these could also have a curved construction, i.e., its angle relative to the plane would change over its course. Here, in addition to a section sitting at an angle to the plane 45 (optionally at a changing angle), a position or a section could also be provided in which the guide surface lies parallel to the plane 45, in particular, at the beginning of the guide surface (with respect to its guide function during the closing of the valve plate 7).

In the illustrated embodiment, the guide surfaces with a flat construction lie parallel to each other, wherein low surface pressures are achieved.

During the closing of the vacuum valve, starting from the open position of the valve plate 7, this is initially shifted by the actuators 12 in the main closing direction 14 until the guide elements 15, 17; 16, 18 engage with each other. The guide elements thus interact only over the final section of the closing path, but not over the main section of the closing movement. Further shifting of the valve plate 7 by the actuators 12, wherein the valve rods 13 are moved further by the actuators 12 in the same direction, leads to movement of the valve plate at an angle to the main closing direction 14 due to the guide of the valve plate 7 by the interacting guide elements 15, 17; 16, 18 and, indeed, in a direction that lies in the plane that is spanned by the main closing direction 14 and the axis 9 of the valve opening 6. Here, the valve plate approaches the valve seat and is finally pressed onto this seat. This guide of the valve plate 7 in the final section of its closing movement could also be designated as connecting-rod guidance.

In FIG. 14, a modification of the previously described embodiment of the vacuum valve is shown. Here, the housing-fixed guide element 16 lying behind the valve opening 6 (with respect to the main closing direction 14) is arranged on the side wall 3, and, indeed, it is formed as a recess in this side wall that has a wall section that forms the guide surface 20 and that bounds an undercut region of the recess. The guide element 16 could also be formed as a projection that is arranged on the side wall 3 and that is formed integrally with the side wall 3 or that is formed by a part attached to the side wall 3 and that has the guide surface 20. The guide element 16 interacts with a guide element 18 that is arranged on the valve plate 6 and that has a guide surface 22. The guide surfaces 20, 22 are formed analogously to those described in connection with the embodiment of FIGS. 1 to 13.

An additional modification of the embodiment described with reference to FIGS. 1 to 13 is shown in FIG. 15. Here, the guide element 15 that is arranged on the wall 1 and that lies in front of the valve opening 6 (with respect to the main closing direction 14) or such a guide element 15 is formed by a recess in the wall 1 that has a guide surface 19 formed by a wall section of the recess. This guide element 15 interacts with a guide element 17 that is arranged on the valve plate 7 and that is formed by a projection that is arranged on the valve plate 7 and that has a guide surface 21 interacting with the guide surface 19. The projection forming the guide element 17 can here be formed by a part attached to the valve plate 7 or integrally with the valve plate 7. The guide surfaces 19, 21 are constructed analogously like those described in connection with the embodiment of FIGS. 1 to 13.

In one possible modification of the described embodiments, one of the two interacting guide elements 15, 17 or 16, 18 could have, instead of a guide surface, one or more rollers that can roll on the guide surface of the other of the two guide elements, wherein this guide surface sits in the described way at an angle to the plane 45 in which the sealing surface 10 or the sealing ring of the valve seat lies. Thus, for example, the guide element arranged in front of the valve opening 6 on the wall 1 or such a guide element 15 could be formed by a roller that is supported so that it can rotate by a bearing part attached to the wall 1 and projecting from this wall. An analogous situation applies for the construction of the guide element 16 arranged stationary to the wall. Instead of the guide elements 15, 16 arranged stationary to the wall 1, the guide elements 17, 18 of the valve plate 7 could also comprise such rollers that are supported so that they can rotate by bearing parts.

The construction of a vacuum valve according to the invention is also possible without a closed valve housing or without a wall 2 opposite the wall 1 having the valve opening 6. The wall having the valve opening 6 could also be part of a vacuum chamber. Here, the valve plate 7 could be arranged within the chamber or outside of the chamber. Such vacuum valves through which an opening in the wall of a chamber can be blocked are also designated as doors.

A vacuum valve constructed in a manner according to the invention is suitable, in particular, for closing elongated valve openings 6, i.e., the length of the valve opening measured perpendicular to the main closing direction 14 is significantly larger than the width measured in the direction of the main closing direction 14. For example, the length of the valve opening 6 measured perpendicular to the main closing direction 14 can equal at least 100 cm. Such valve openings are used for the transfer of substances between vacuum chambers or in the vacuum region, for example, for the processing of panels for flat screens.

A vacuum valve according to the invention could have a construction that is resistant to differential pressure in one direction (for pressure differences up to one atmosphere) or a construction that is resistant to differential pressure in two directions (for pressure differences up to one atmosphere).

If the vacuum valve according to the invention is to be used for applications in which a seal of the valve opening 6 is required only for a differential pressure acting in the direction of a pressing of the valve plate 7 on the valve seat, then it could also be provided that the valve plate 7 is pressed in its closed position by the at least one actuator only relatively slightly onto the valve seat and the full sealing force is generated by the differential pressure. The force with which the sealing ring 11 is pressed onto the sealing surface 10 by the effect of the at least one actuator 12 can here equal advantageously less than 1 N/mm sealing length (without acting differential pressure). For example, this force could equal 0.1-0.3 N/mm of sealing length. Such a construction could be used especially for a construction of the vacuum valve as a door.

An additional embodiment of the invention is shown in FIGS. 16 to 28. In addition to the valve plate 7 that forms a first closing element, a second closing element 23 is provided that can be moved independent of the valve plate 7. In addition to the first valve opening 6 that can be closed by the valve plate 7 in the first wall 1, a second valve opening 24 is provided in the second wall 2 that is freed from the closing element in an open position of the second closing element 23 and that is sealed by the closing element in a closed position of the second closing element 23.

Figure 29:
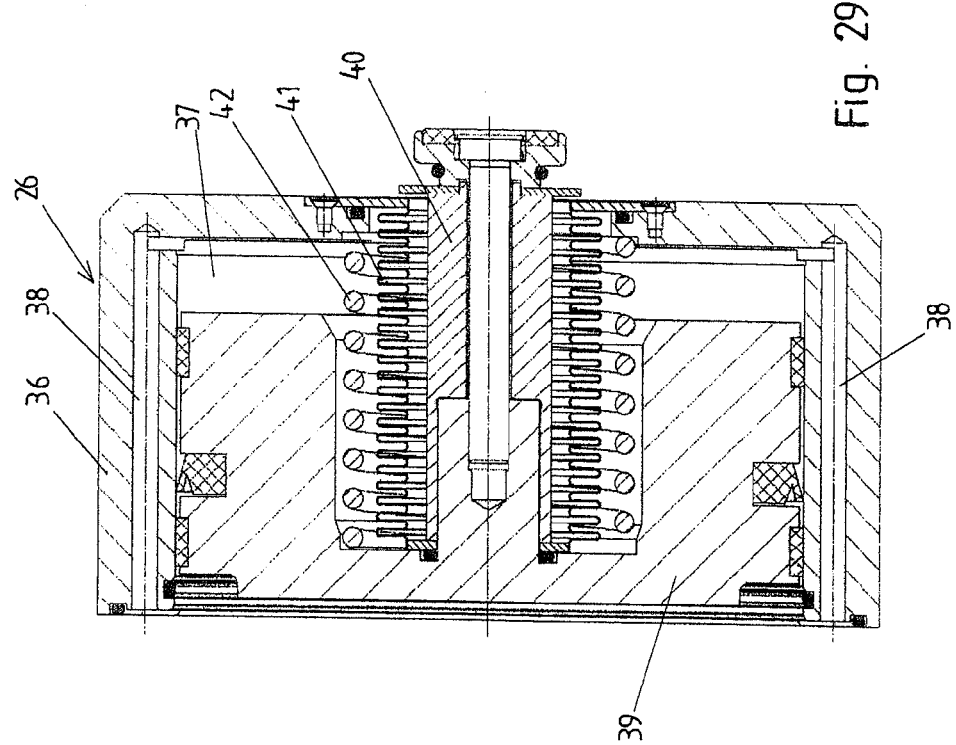

The open position of the second closing element in which it frees the second valve opening 24 is shown in FIG. 17. For closing the second closing element 23, starting from its open position, the second closing element 23 is initially moved by at least one actuator 25, in the illustrated embodiment, two actuators 25 are provided in a main closing direction 46. Advantageously, the main closing direction 46 lies parallel to and aligned with the main closing direction 14 of the valve plate 7. For example, the main closing direction 46 of the second closing element 23 could also lie parallel to and opposite the main closing direction 14 of the valve plate 7. If an intermediate position of the second closing element 23 is reached in which the second closing element covers the second valve opening 24, but is still raised from the valve seat surrounding the second valve opening 24 (cf. FIGS. 18 and 19), then the movement of the second closing element 23 is completed by the at least one actuator 25. Then the second closing element 23 is moved by at least one additional actuator 26. In FIGS. 17 to 20, 22, 23, and 25, the actuator 26 is shown only schematically as a block. One possible construction of the actuator is shown in FIG. 29. Advantageously, several actuators 26 that are activated in sync are provided in the direction perpendicular to the main closing direction 46 or parallel to the longitudinal extent of the second valve opening 24.

The second closing element 23 is thus carried by a support unit 27 that comprises the at least one actuator 26. In the shown embodiment, the support unit 27 is held on two valve rods 28. More or less than two valve rods 28 could also be provided. The support unit 27 is held on the at least one valve rod 28. Each valve rod 28 is shifted by the corresponding actuator 25, wherein the support unit 27 and with it the second closing element 23 are moved in the main closing direction of the second closing element 23.

The connection of the second closing element 23 to the support unit 27 is realized by the at least one actuator 26 that is arranged on the support unit 27 and that moves the second closing element 23 perpendicular to the main closing direction of the second closing element or parallel to the axis 29 of the second valve opening 24 in the wall 2. Therefore, the second closing element 23, starting from the intermediate position shown in FIGS. 18 and 19, can be shifted in the direction toward the valve seat surrounding the second valve opening 24 and placed onto this seat, wherein an elastic sealing ring 30 is pressed onto a sealing face 31. In the illustrated embodiment, the sealing ring 30 is arranged on the second closing element 23 and the sealing surface 31 is arranged on the valve seat. A reverse arrangement is also possible.

If the second closing element 23 is pressed by the at least one actuator 26 onto the valve seat surrounding the second valve opening 24, then the support unit 27 is supported on the side facing away from the second valve opening 24. Here, the valve rods 28 move somewhat. In this way, the pressing force needed for pressing the second closing element 23 onto the valve seat is transmitted essentially by the housing (and not by the valve rods 28).

The support of the support unit 27 in the closed position of the second closing element 23 is realized, first, on the valve plate 7 and, second, on the at least one guide element 16 arranged behind the valve opening 6 with respect to the main closing direction 14. Here, an elastic support ring 32 is arranged on the support unit 27, by which this support ring is realized, in order to prevent metal-on-metal contact. Elastic support parts with different constructions could also be arranged on the support unit 27 and/or on the parts on which it is supported on its side facing away from the second wall 2.

The support can be performed, for example, as shown, by a plate-shaped part 33 of the support unit 27 on which the support ring 32 is arranged or on which elastic support parts constructed in a different way could be arranged.

On the side lying behind the valve opening 6 with respect to the main closing direction 14, a support is also possible on a different housing-fixed part that is arranged on the wall 1 or on the side wall 3 projecting from the wall 1.

It is preferred when, in the open position of the valve plate 7, a front section of the valve plate 7 with respect to the main closing direction 14 is pressed onto the wall 1, in order to obtain a defined stable position of this front section of the valve plate 7 on which the support unit 27 is supported. This contact of the front section of the valve plate 7 on the wall 1 can be realized by interacting guide surfaces 34, 35 of the guide elements 15, 17. Here, at least one of these guide surfaces 34, 35 sits at an angle to the plane 45 of the sealing surface 10 or the sealing ring of the valve seat surrounding the valve opening 6. Instead of interacting guide surfaces, one of the two guide elements 15, 17 could also have at least one roller that rolls over the guide surface of the other of the two guide elements 15, 17.

The actuators 25, 26 could be constructed conventionally as is known from U.S. Pat. No. 6,899,316 B2 named in the introduction to the description. The support unit could consequently have a continuous, bar-shaped part in which a series of cylinder spaces in which pistons are arranged. FIG. 29 shows an embodiment of an actuator 26 that is somewhat modified relative to this. A pot-shaped part 36 that has a cylinder space 37 is screwed on the plate-shaped part 33 (screw holes 38 are shown in FIG. 29). In the cylinder space 37, a piston 39 is arranged that can be shifted in the cylinder space using compressed air. A piston rod 40 is activated by the piston 39, wherein the plate-shaped second closing element 23 is attached to this piston rod. For sealing between the pot-shaped part 36 and the piston 39, a bellows 41 is used. A spring 42 biases the piston 39 into a position in which the second closing element 23 is raised from the valve seat surrounding the second valve opening 24.

Figure 27:
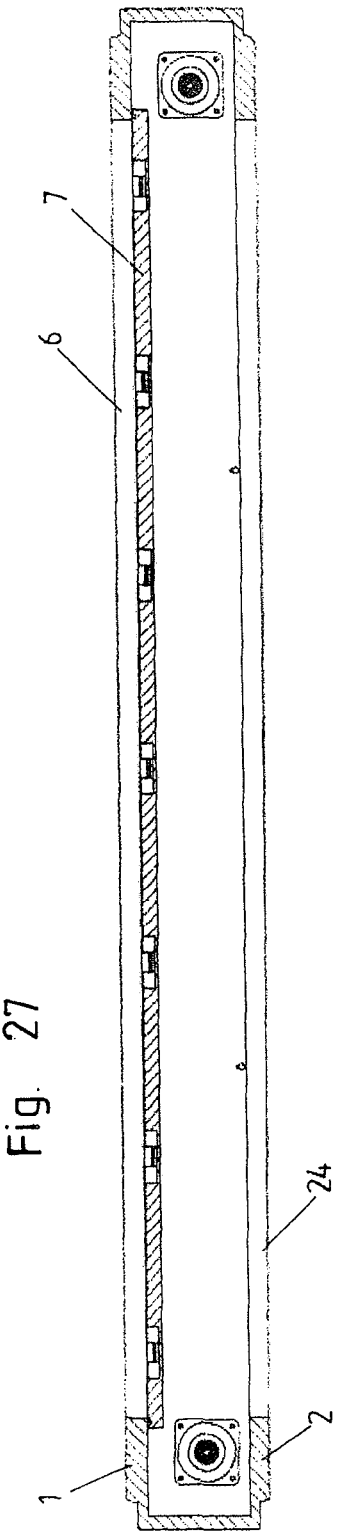
Figure 26:
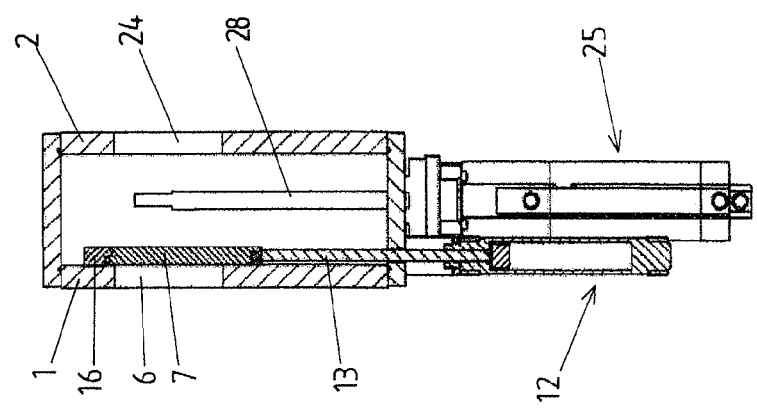
Figure 28:
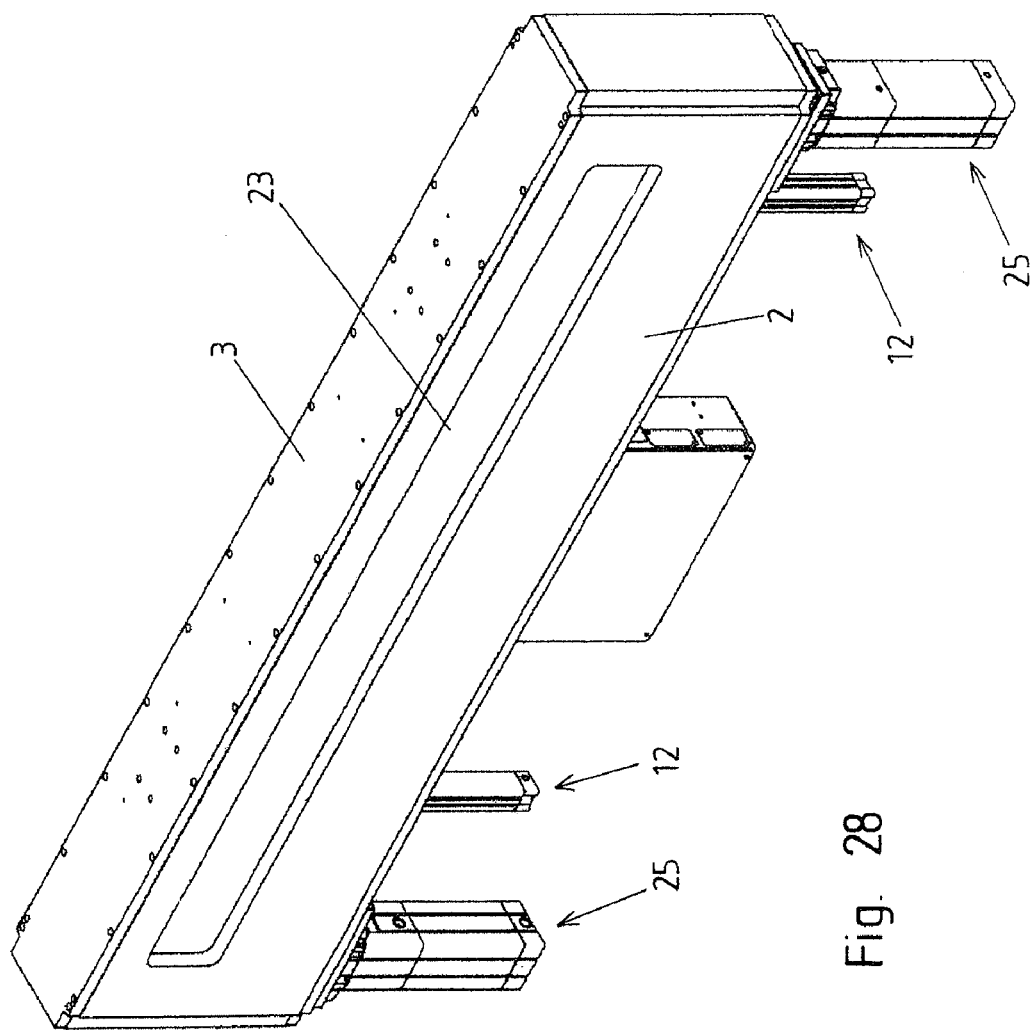

A vacuum valve constructed in this way can be used, for example, in a vacuum installation for carrying out processing steps on substrates under a vacuum, in particular, several processing chambers are provided in which parallel vacuum processes can be performed. In normal operation, the valve plate 7 remains in its open position and the opening and closing of the vacuum valve is performed by the second closing element 23 by which the second valve opening 24 can be freed or sealed. If service of the second closing element is required, for example, the elastic sealing ring 30 must be changed, then the first valve opening 6 is sealed using the valve plate 7. Here, the second closing element 23 is located in its open position or its intermediate position. Consequently, the valve housing of the vacuum valve can be opened and the second closing element can be removed for the service to be performed, as is shown in FIGS. 26 and 27. The chamber to which the vacuum valve is connected by the first valve opening 6 or the part of the vacuum installation connected to this first valve opening 6 can be kept under a vacuum. After the service has been performed and the second closing element has been assembled, the valve housing can be closed again and the valve plate 7 can be opened after pumping.

In a vacuum valve constructed in this way, a construction that is resistant to differential pressure for the second closing element against a differential pressure that acts in the sense of lifting the second closing element from its valve seat and that equals up to atmospheric pressure can be eliminated. If a higher differential pressure acting in this direction is to be sealed, then this can be realized by the valve plate 7.

Instead of the movement of the second closing element 23 according to the type of the described construction of an L-valve, an L-valve constructed in a different way could also be used. The movement and adjustment of the second closing element 23 could also be realized according to a kind of slide valve in which, in the final section of the closing movement, the second closing element is spread apart by a carrier plate and advantageously a support plate arranged on the opposite side of the carrier plate is also spread apart by the carrier plate. The carrier plate or, if present, the support plate, could here be supported analogous to the plate-shaped part 33 on the valve plate 7 and on a part lying behind the first valve opening 6 (with respect to the main closing direction 14). For the construction according to a kind of slide valve with a spreading mechanism, only one type of actuator must be provided that moves the valve rod or the corresponding valve rod and here moves over the entire closing path by the second closing element 23.

For the closure of the second valve opening by the second closing element 23, a construction could also be used in which only a linear movement of the closure element is performed, wherein the valve seat has a three-dimensional construction and, in the closed position of the second closing element, a corresponding three-dimensionally constructed sealing ring is pressed onto a sealing surface with a corresponding profile.

As emerges from the preceding description, the field of the invention is not limited to the shown embodiments, but instead should be defined with reference to the accompanying claims together with their full range of possible equivalents.

LEGEND OF THE REFERENCE SYMBOLS

1 Wall
2 Wall
3 Side wall
4 Side wall
5 Inner space
6 Valve opening
7 Valve plate
8 Opening
9 Axis
10 Sealing surface
11 Sealing ring
12 Actuator
13 Valve rod
14 Main closing direction
15 Guide element
16 Guide element
17 Guide element
18 Guide element
19 Guide surface
20 Guide surface
21 Guide surface
22 Guide surface
23 Second closing element
24 Second valve opening
25 Actuator
26 Actuator
27 Support unit
28 Valve rod
29 Axis
30 Sealing ring
31 Sealing surface
32 Support ring
33 Plate-shaped part
34 Guide surface
35 Guide surface
36 Pot-shaped part
37 Cylinder space
38 Screw hole
39 Piston
40 Piston rod
41 Bellows
42 Spring
43 Side wall
44 Side wall
45 Plane
46 Main closing direction

The invention claimed is:
1. A vacuum valve comprising:
a valve housing with an inner space that forms a vacuum region of the vacuum valve and that is bounded on a first side by a first wall and on an opposite second side by a second wall;

the first wall has a first opening and a valve seat, the valve seat surrounds the first opening and has a sealing surface lying in a plane or a sealing ring lying in a plane;

the second wall has a second opening;

a valve plate that is arranged in the inner space of the valve housing and that can be adjusted over a closing path from an open position, in which it frees the first opening, into a closed position, in which it closes the first opening, the valve plate has a sealing ring that is pressed in the closed position onto the sealing surface of the valve seat or a sealing surface on which the sealing ring of the valve seat is pressed in the closed position, and during the closing of the vacuum valve, the valve plate is moved from the open position of the valve plate over a main section of the closing path in a main closing direction that is parallel to the valve plate and parallel to the plane of the sealing surface or the sealing ring of the valve seat and is then moved, following the main section of the closing path, over a final section of the closing path running at an angle to the valve plate and at an angle to the plane of the sealing surface or the sealing ring of the valve seat for guiding the valve plate onto the valve seat;

a first guide element that guides the valve plate over the final section of the closing path is arranged on the first wall in front of the valve opening with respect to the main closing direction;

a second guide element which is arranged on the valve plate interacts with the first guide element, wherein the valve plate is guided over the final section of the closing path by guide surfaces at an angle to a plane of the sealing surface or the sealing ring of the valve seat, and at least one of the guide surfaces is arranged on the first guide element or on the second guide element, and wherein the first guide element is L-shaped and is formed by a projection of the first wall or a part attached to the first wall, and projects into a recess in the valve plate, with the recess lying in front of the first opening with respect to the main closing direction, or the second guide element is L-shaped and is formed by a projection of the valve plate or a part attached to the valve plate, and projects into a recess in the first wall, with the recess lying in front of the first opening with respect to the main closing direction.

2. The vacuum valve according to claim 1, wherein a third guide element is stationary relative to the first wall and lies behind the first opening with respect to the main closing direction, and a fourth guide element, which is arranged on the valve plate, interacts with the third guide element.

3. The vacuum valve according to claim 1, wherein at least one of the guide surfaces is arranged on the projection which forms the first guide element and sits at an angle to the plane of the sealing surface or the sealing ring of the valve seat and interacts with the second guide element.

4. The vacuum valve according to claim 1, wherein at least one of the guide surfaces is arranged on a wall section of the recess in the valve plate and sits at an angle to the plane of the sealing surface or the sealing ring of the valve seat and interacts with the first guide element.

5. The vacuum valve according to claim 1, wherein several projections forming first guide elements are arranged on the first wall in front of the first opening with respect to the main closing direction and several recesses are arranged on the valve plate, and the first guide elements project into the recesses.

6. The vacuum valve according to claim 1, wherein at least one of the guide surfaces is arranged on a wall section of the recess in the first wall and sits at an angle to the plane of the sealing surface or the sealing ring of the valve seat and interacts with the projection forming the second guide element.

7. The vacuum valve according to claim 1, wherein at least one of the guide surfaces is arranged on the projection forming the second guide element and sits at an angle to the plane of the sealing surface or the sealing ring of the valve seat and interacts with the first guide element.

8. The vacuum valve according to claim 1, wherein several projections forming second guide elements are arranged on the valve plate and the wall has several recesses in which the second guide elements project in a region in front of the first opening with respect to the main closing direction.

9. The vacuum valve according to claim 1, wherein the third guide element is formed by a projection of the first wall or a part attached to the first wall and projecting from the first wall and at least one of the third or fourth guide element has at least one of the guide surfaces that sits at an angle to the plane of the sealing surface or the sealing ring of the valve seat.

10. The vacuum valve according to claim 2, wherein the third guide element is arranged on a side wall of the vacuum valve, which projects from the first wall, and at least one of the third or fourth guide elements has at least one of the guide surfaces that sits at an angle to the plane of the sealing surface or the sealing ring of the valve seat.

11. The vacuum valve according to claim 10, wherein the fourth guide element is formed by a projection of the valve plate, and the projection projects from a front edge of the valve plate with respect to the main closing direction.

12. The vacuum valve according to claim 11, wherein one of the guide surfaces that sits at an angle to the plane of the sealing surface or the sealing ring of the valve seat is arranged on a side of the projection projecting from the front edge of the valve plate, which side faces away from the first wall.

13. The vacuum valve according to claim 11, wherein, for moving the valve plate across the closing path, there is at least one actuator that moves the valve plate over the entire closing path.

14. The vacuum valve according to claim 1, wherein the guide elements that guide the valve plate over the final section of its closing path are arranged in the inner space of the valve housing.

15. The vacuum valve according to claim 1, wherein, in the inner space of the valve housing, in addition to the valve plate that forms a first closing element for closing the first opening in the first wall, a second closing element is arranged that can be moved between an open position, in which it frees the second opening arranged in the second wall, and a closed position, in which closes and seals the second opening independent of the valve plate.

16. The vacuum valve according to claim 1, wherein the second closing element can be moved into an intermediate position in which it covers the second opening but is lifted from a second valve seat surrounding the second opening.

17. The vacuum valve according to claim 16, wherein, for moving the second closing element between the open position and the intermediate position, at least one actuator is provided that is arranged outside of the valve housing and that can be moved in an axial direction by at least one valve rod with which the second closing element moves.

18. The vacuum valve according to claim 17, wherein at least one additional actuator is provided that is arranged on a support unit that is attached to the at least one valve rod and by which the second closing element can be moved between the intermediate position and the closed position.

19. The vacuum valve according to claim 16, wherein a part moving with the second closing element during the movement of the second closing element between the open position and the intermediate position is supported on the valve plate in the closed position of the second closing element in a region of a side thereof facing away from the second opening.

20. The vacuum valve according to claim 19, wherein the part that is moved with the second closing element during the movement of the second closing element between the open position and the intermediate position is further supported on at least one of the guide elements in a region of its side facing away from the second opening, and the guide element is arranged on the first wall having the first opening or on a side wall projecting from the first wall.

21. The vacuum valve according to claim 19, wherein the supporting part of the support unit has a plate-shaped construction.

* * * * *